United States Patent [19]

Taniguchi

[11] Patent Number: 5,072,392

[45] Date of Patent: Dec. 10, 1991

[54] SUSPENSION CONTROL SYSTEM FOR AUTOMOTIVE VEHICLE WITH FEATURE OF DISCRIMINATION OF VEHICULAR DRIVING CONDITION ON THE BASIS OF VARIATION OF LATERAL ACCELERATION

[75] Inventor: Minoru Taniguchi, Kanagawa, Japan

[73] Assignee: Atsugi Unisia Corporation, Kanagawa, Japan

[21] Appl. No.: 452,590

[22] Filed: Dec. 19, 1989

[30] Foreign Application Priority Data

Dec. 20, 1988 [JP] Japan .............................. 63-16463[U]

[51] Int. Cl.$^5$ .............................................. B60G 17/01
[52] U.S. Cl. .................... 364/424.05; 280/707
[58] Field of Search ....................... 364/424.05, 424.01; 280/707

[56] References Cited

U.S. PATENT DOCUMENTS

| | | | |
|---|---|---|---|
| 4,527,676 | 7/1985 | Emura et al. | 188/299 |
| 4,620,619 | 11/1986 | Emura et al. | 188/319 |
| 4,652,010 | 3/1987 | Sugasawa | 280/707 |
| 4,659,104 | 4/1987 | Tanaka et al. | 280/707 |
| 4,686,626 | 8/1987 | Kuroki et al. | 280/707 X |
| 4,702,490 | 10/1987 | Yamaguchi et al. | 280/707 |
| 4,712,807 | 12/1987 | Kurosawa | 280/707 |
| 4,718,695 | 1/1988 | Kawagoe | 280/707 |
| 4,787,644 | 11/1988 | Yokote et al. | 280/6 R |
| 4,796,911 | 1/1989 | Kuroki et al. | 280/689 |
| 4,907,154 | 3/1990 | Yasuda et al. | 364/424.05 |
| 4,916,632 | 4/1990 | Doi et al. | 364/508 |
| 4,924,392 | 5/1990 | Kurosawa | 364/424.05 |

FOREIGN PATENT DOCUMENTS 3632919 3/1988 Fed. Rep. of Germany .
62-72811 5/1987 Japan .

Primary Examiner—Thomas G. Black
Attorney, Agent, or Firm—Ronald P. Kananen

[57] ABSTRACT

A suspension control system monitors a lateral acceleration exerted on a vehicular body. Based on the lateral acceleration, discrimination of mode of vibration of a vehicular body is performed by deriving variation rate of magnitude of lateral acceleration. The variation rate of lateral acceleration is then compared with a reference value so that suspension characteristics can be controlled on the basis of the variation rate of the lateral acceleration.

6 Claims, 5 Drawing Sheets

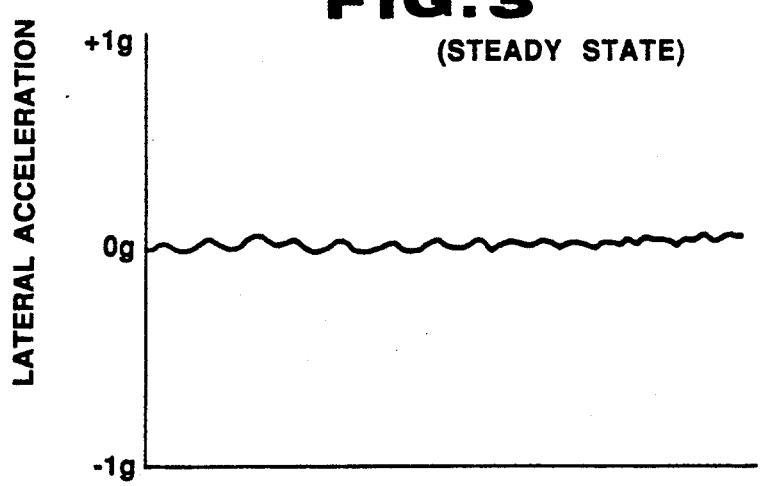
FIG. 3 (STEADY STATE)
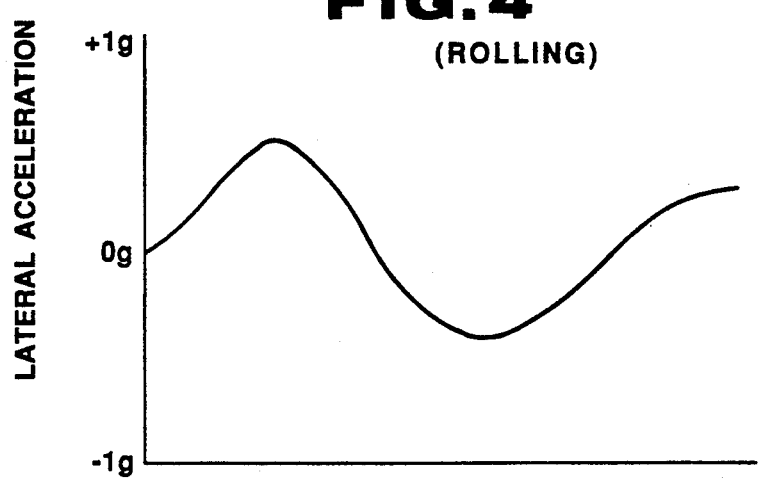
FIG. 4 (ROLLING)
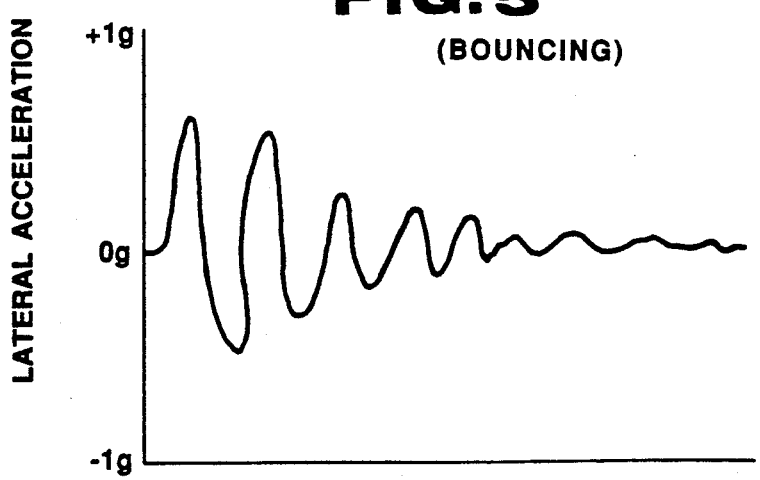
FIG. 5 (BOUNCING)

SUSPENSION CONTROL SYSTEM FOR AUTOMOTIVE VEHICLE WITH FEATURE OF DISCRIMINATION OF VEHICULAR DRIVING CONDITION ON THE BASIS OF VARIATION OF LATERAL ACCELERATION

BACKGROUND OF THE INVENTION

1. Field of the Invention

The present invention relates generally to a control system for an automotive suspension system, which controls suspension characteristics depending upon vehicle driving conditions. More specifically, the invention relates to a suspension control system which utilizes information representative of a lateral acceleration exerted on the vehicular body as a vehicular driving condition representative parameter.

2. Description of the Background Art

In the modern automotive technologies, it has been considered an important task to achieve both riding comfort and driving stability by adjusting suspension characteristics of a vehicular suspension system. For example, Japanese Utility Model First (unexamined) Publication (Jikkai) Showa 62-38402 discloses a suspension control system which performs control of suspension characteristics depending upon vehicle speed and the magnitude of lateral acceleration exerted on the vehicular body. In the practical control as disclosed, the control system is responsive to vehicle speeds higher than or equal to 30 km/h and lower than 80 km/h and to lateral acceleration greater than or equal to 0.2 to harden suspension characteristics; and the control system is responsive to the lateral acceleration magnitude greater than or equal to 0.1 to harden suspension characteristics while the vehicle speed is higher than or equal to 80 km/h. With such process of suspension control, a certain level of improvement in riding comfort and driving stability can be achieved.

In such a prior proposed suspension control system, the suspension characteristics are determined simply depending upon the magnitude of lateral acceleration and irrespective of the mode of vibration induced in the vehicular body. As will be appreciated, vehicular body vibration is caused by various causes, and the mode of vibration is variable depending upon the causes. Namely, when the vehicular body rolls during cornering, the vehicular vibration is in a rolling mode with relatively low frequency and relatively great magnitude. On the other hand, when the vehicular vibration is caused by undulation on the road surface or by road shock, vehicular body vibration is in a bounding and rebounding mode with relatively high frequency and relatively small magnitude. Depending upon the mode of vibration, required suspension characteristics at the same magnitude of lateral acceleration may be different. For example, in vehicular rolling, it is preferred to harden suspension characteristics in order to provide higher, cornering stability. On the other hand, on certain occasions, a magnitude of lateral acceleration equivalent to the vehicular rolling mode can be induced in a bouncing mode vibration when the vehicle passes over a projection on the road, such as a step at road side edging. In such a case, as set forth above, a harder suspension is preferred in response to vehicular rolling. On the other hand, in the case of bouncing, a softer suspension effective for absorbing vibration energy is preferred. Since the prior proposed suspension control systems cannot adapt the suspension characteristics to the mode of the vehicular body vibration, the control is not completely satisfactory as to the desired level of riding comfort and driving stability.

In addition, the prior proposed suspension control system switches suspension characteristics from softer characteristics to harder characteristics every time the magnitude of lateral acceleration exceeds a predetermined criterion irrespective of mode of vibration. Therefore, even when the vibration mode does not require harder suspension, a switching of suspension characteristics is caused. This necessitates an unnecessarily high frequency of switching operation for shorten life of suspension characteristics adjustable valve structure and/or actuator.

SUMMARY OF THE INVENTION

Therefore, it is an object of the invention to provide a suspension control system which can discriminate the modes of vehicular body vibration and determine suspension characteristics based on the lateral acceleration exerted on the vehicular body and the mode of vehicular body vibration.

In order to accomplish the aforementioned and other objects, a suspension control system, according to the present invention, monitors the lateral acceleration exerted on a vehicular body. Based on the lateral acceleration, discrimination of modes of vibration of the vehicular body is performed by deriving the variation rate of the magnitude of lateral acceleration. The variation rate of lateral acceleration is then compared with a reference value so that suspension characteristics can be controlled on the basis of the variation rate of the lateral acceleration.

In order to accomplish the aforementioned and other objects, a suspension control system for an automotive vehicle comprises:

means for adjusting suspension characteristics of a suspension system disposed between a vehicle body and a suspension member rotatably supporting a vehicular wheel;

means for monitoring lateral acceleration exerted on the vehicular body and producing a lateral acceleration indicative signal;

means for deriving a variation rate of lateral acceleration on the basis of the lateral acceleration indicative signal; and means for detecting the mode of vibration of the vehicular body on the basis of the variation rate of lateral acceleration for deriving a suspension control signal representative of one of a plurality of suspension characteristics and adapted to the detected mode of vibration of the vehicular body, for controlling the suspension characteristics adjusting means.

The detecting means may compare the variation rate of the lateral acceleration with a predetermined first threshold value representative of a criterion between vehicular bouncing and vehicular rolling for deriving suspension characteristics on the basis of the result of comparison. Also, the detecting means may further compare the variation rate of the lateral acceleration with a second threshold value representative of a criterion between vehicular rolling and steady traveling state so as to derive suspension characteristics on the basis of the result of comparison.

In the alternative, the detecting means determines the control signal ordering a harder suspension characteristics when the vehicular vibration mode in rolling is detected. In such a case, the variation rate deriving means may derive a first variation rate over a first, longer time interval and a second variation rate over a second, shorter time interval, and the detecting means compares the first variation rate with the first threshold for discriminating the vehicular vibration mode between a bouncing mode and a rolling mode. In addition, the detecting means may compare the second variation rate with a second threshold defining a criterion between a vehicular rolling mode and a steady traveling state for discriminating rolling state and steady state.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings:

FIGS. 3 through 5 are charts showing modes of vibration of road shock, vehicular rolling and vehicular bouncing;

DESCRIPTION OF THE PREFERRED EMBODIMENT

Figure 1:
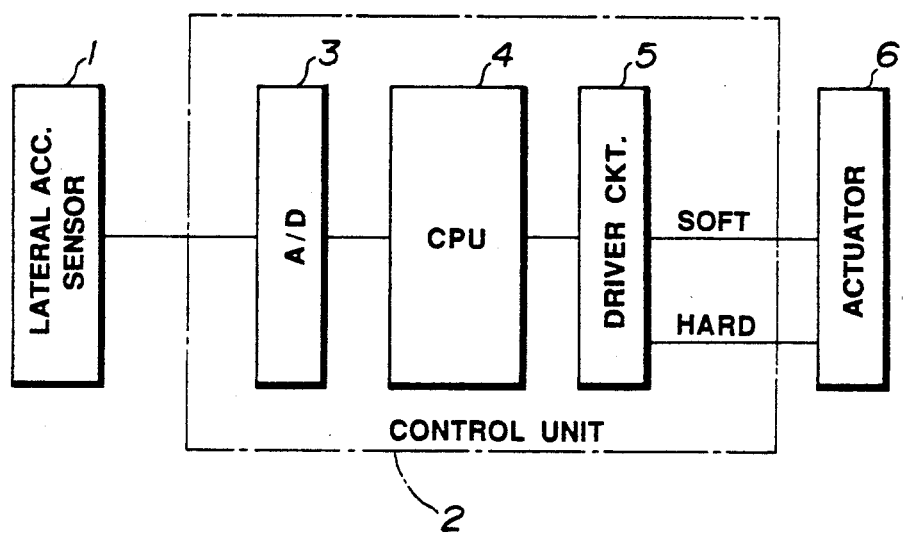
FIG. 1 is a schematic block diagram of the preferred embodiment of a suspension control system according to the present invention.

Referring now to the drawings, particularly to FIG. 1, the preferred embodiment of a suspension control system, according to the present invention, employs a lateral acceleration sensor 1 which monitors a lateral acceleration exerted on a vehicular body for producing a lateral acceleration indicative signal. The lateral acceleration sensor 1 is connected to a microprocessor-based control unit 2 which has an analog-to-digital (A/D) converter 3. The A/D converter 3 receives the lateral acceleration indicative signal of the lateral acceleration sensor, which signal is supplied in a form of analog signal, and converts the received analog format signal into a digital signal so that the control unit 2 may process the lateral acceleration indicative signal. The control unit 2 also includes a central processing unit (CPU) 4 which serves as an arithmetic circuit for processing the input data and for deriving a suspension control signal representing commands for harder suspension characteristics and softer suspension characteristics. CPU 4 is connected to a driver signal generator circuit 5 which receives the suspension control signal to generate a driver signal for driving an actuator 6 for adjusting the suspension characteristics of the vehicular suspension system.

The actuator 6 may be associated with an active suspension component for varying suspension characteristics. For example, such active component may comprise a variable damping characteristics shock absorber, a pneumatic spring system in a pneumatic or hydropneumatic suspension system, or pneumatic or hydraulic actuators in an active suspension system and so forth. In any event, the actuator 6 in the shown embodiment represents the suspension component or components which vary at least one of damping characteristics and spring characteristics of the suspension system. In addition, it should be appreciated that, though the shown embodiment is directed to a suspension system which is two-way variable of the suspension characteristics between a HARD mode and a SOFT mode, it is, of course, possible to employ a multi-way, i.e. three-way or more, variable suspension system.

For example, in case the suspension system employs a variable damping characteristics shock absorber as the active suspension component which is active for varying the suspension characteristics, the shock absorber may have a construction such as that disclosed in the following prior patents.

U.S. Pat. No. 4,527,676, issued on July 9, 1985
U.S. Pat. No. 4,620,619, issued on Nov. 4, 1986
U.S. Pat. No. 4,686,626, issued on Mar. 16, 1987
U.S. Pat. No. 4,652,010, issued on Mar. 24, 1987
U.S. Pat. No. 4,796,911, issued on Jan. 10, 1989

On the other hand, in case the suspension system employs a pneumatic spring as the active suspension component, such component may be as disclosed in the following prior patents:

U.S. Pat. No. 4,659,104, issued on Apr. 21, 1987
U.S. Pat. No. 4,718,695, issued on Jan. 12, 1988
U.S. Pat. No. 4,787,644, issued on Nov. 29, 1988

Also, in case the suspension system is an active suspension system, the active suspension component for varying suspension characteristics may be a hydraulic or pneumatic cylinder associated with a pressure control unit which controls the pressure of a pressure medium. An active suspension system with such active suspension components has been disclosed in the following prior patent:

U.S. Pat. No. 4,702,490, issued on Oct. 27, 1987

The disclosure of the prior patents set forth above is herein incorporated by reference for the sake of disclosure.

The operation of the shown embodiment of the suspension control system will be discussed herebelow with reference to FIG. 3. FIG. 3 shows a flowchart of a suspension control program implementing the preferred process in switching the suspension characteristics between a HARD mode and a SOFT mode. The shown routing may be triggered periodically, such as every 20 ms.

Immediately after starting execution, the lateral acceleration indicative signal in a digital form is read out at a step 101. The instantaneous lateral acceleration indicative signal value is then stored in an appropriate address in a memory or register or so forth. At a step 102, a variation rate A of the lateral acceleration is derived on the basis of the instantaneous lateral acceleration indicative signal value and a previously sampled lateral acceleration indicative signal value which is sampled a predetermined period ahead of the present timing. For example, in the shown embodiment, the variation rate A of the lateral acceleration is derived on the basis of the instantaneous lateral acceleration magnitude and the lateral acceleration magnitude of 200 ms before. In practice, the variation rate can be derived by differentiation.

The variation rate A is then compared with a first threshold value $A1_{ref}$ at a step 103. The first threshold value $A1_{ref}$ is set at a value representative of a possible maximum variation of lateral acceleration. In the shown embodiment, the first threshold value $A1_{ref}$ is set at a value corresponding to 0.3 G. If the variation rate A is greater than or equal to the first threshold value $A1_{ref}$, then process directly goes to END. In such a case, since the process jumps steps required for adjustment of the suspension characteristics, the suspension, characteristics are held unchanged.

On the other hand, when the variation rate A is smaller than the first threshold value $A1_{ref}$ as checked at the step 103, the variation rate is compared with a second threshold value $A2_{ref}$ at a step 104. The second threshold value $A2_{ref}$ is set at a value representative of a criterion of vehicular rolling. Namely, when variation rate A is greater than the or equal to the second threshold value $A2_{ref}$, it represents vehicular rolling in a magnitude requiring harder suspension characteristics for driving stability. In practice, the second threshold value $A2_{ref}$ is set at a value corresponding to 0.15 G.

Therefore, when the variation rate A is greater than or equal to the second threshold value $A2_{ref}$, a suspension control signal ordering a HARD mode of the suspension characteristics is output at a step 105 in order to drive the actuator 6 for obtaining the HARD mode of the suspension system. On the other hand, when the variation rate A is smaller than the second threshold value $A2_{ref}$, a suspension control signal ordering a SOFT mode of the suspension characteristics is output at a step 106 for operating the actuator 6 for obtaining softer suspension characteristics.

Figure 6:
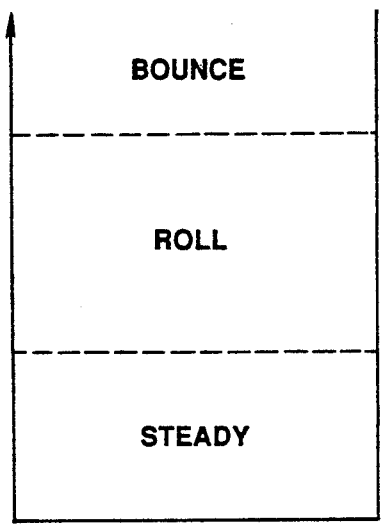
FIG. 6 is a chart showing a variation rate of lateral acceleration relative to the modes of vibration of road shock, vehicular rolling and vehicular bouncing.

Here, the relationship between the vehicular driving behavior and the variation of the lateral acceleration magnitude will be briefly discussed with reference to FIGS. 3 through 5. FIG. 3 shows the variation of the lateral acceleration during straight steady state travel. As can be seen from FIG. 3, in the steady state traveling of vehicle, the variation of the lateral acceleration is caused at relatively high frequency but substantially small amplitude. On the other hand, a vehicular body can roll due to lateral acceleration exerted on the vehicular. As shown in FIG. 4, the vehicular body rolls, the variation characteristics of the lateral acceleration become substantially low in frequency and great in amplitude. In contrast to the variation characteristics of the lateral acceleration during vehicular rolling, substantially high frequency and great magnitude of lateral acceleration is induced during vehicular bouncing motion due to passing over a projection, such as road side edging or so forth, as shown in FIG. 5. Therefore, discrimination of the vehicular body behavior between vehicular rolling and vehicular bouncing can be made by checking the variation rate of lateral acceleration. Namely, when the variation rate of the lateral acceleration is substantially great, a judgement can be made that the vehicle is in a bouncing motion. The manner of discrimination of vehicular body behavior will become clearer from FIG. 6. As can be seen from FIG. 6, a judgement can be made that the vehicle is in a bouncing motion when the variation rate of the lateral acceleration is greater than or equal to the first threshold value $A1_{ref}$, and that the vehicle is in steady state when the variation rate of the lateral acceleration of the lateral acceleration is smaller than the second threshold. Therefore, when the variation rate A is smaller than the first threshold valve $A1_{ref}$ and greater than or equal to the second threshold value $A2_{ref}$, judgement can be made that the vehicle is rolling.

When the vehicle body rolls in a substantial magnitude, harder suspension is preferred in order to provide sufficient vehicle driving stability. On the other hand, in the case of a vehicular bouncing motion, harder suspension may provided rough ride feeling and thus is not preferred as long as the vehicular speed is not substantially high. On the other hand, when bouncing occurs at high speed, harder suspension characteristics are preferred to assure the stability of the vehicle. In the suspension control, vehicular speed dependent suspension control is performed in a per se well known manner for providing harder suspension characteristics when the vehicle speed is higher than a vehicular speed criterion and for otherwise maintaining softer suspension characteristics. Therefore, when vehicular bouncing is detected, the suspension characteristics are maintained unchanged so that the suspension characteristics can be adapted to the vehicle driving condition.

Figure 7:
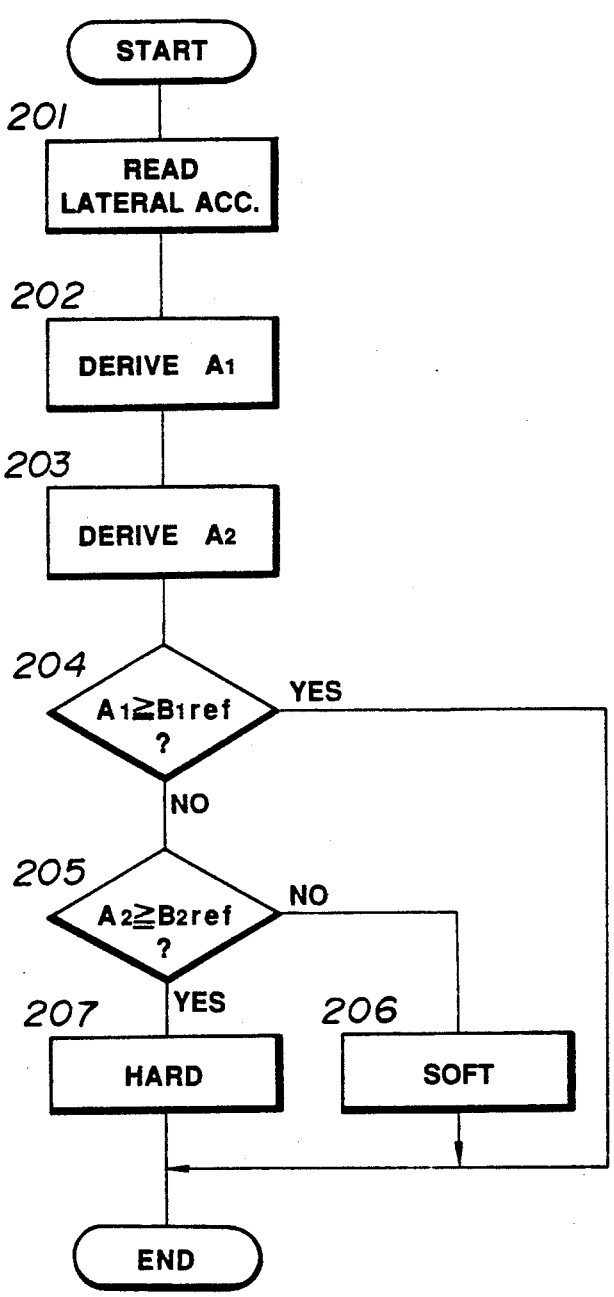
FIG. 7 is a flowchart of another routine for determining suspension characteristics.

FIG. 7 shows another routine of suspension control program for implementing the present invention. The routine is differentiated from the former one by the utilization of two distinct variation rates of lateral acceleration which are derived over mutually distinct time intervals.

Similar to the former routine, immediately after starting execution, the lateral acceleration indicative signal in a digital form is read out at a step 201. The instantaneous lateral acceleration indicative signal value is then stored in an appropriate address in a memory or register or so forth. At a step 202, a first variation rate $A_1$ of the lateral acceleration over a first time interval, e.g. 200 ms, is derived on the basis of the instantaneous lateral acceleration indicative signal value and a previously sampled lateral acceleration indicative signal value which is sampled a predetermined period 200 ms ahead of the present timing. At a step 203, a second variation rate $A_2$ of lateral acceleration over a second time interval, e.g. 50 ms, is derived on the basis of the instantaneous lateral acceleration indicative signal value and a previously sampled lateral acceleration indicative signal value which is sampled a predetermined period 50 ms ahead of the present timing.

The first variation rate $A_1$ is then compared with a first threshold value $B1_{ref}$ at a step 204. The first threshold value $B1_{ref}$ is set at a value representative of a maximum possible variation of lateral acceleration during vehicular rolling. In the shown embodiment, the first threshold value $B1_{ref}$ is set at a value corresponding to 0.3 G. If the first variation rate $A_1$ is greater than or equal to the first threshold value $B1_{ref}$, then the process directly goes to END. In such a case, since the process jumps steps required for adjustment of the suspension characteristics, the suspension characteristics are held unchanged.

On the other hand, when the first variation rate $A_1$ is smaller than the first threshold value $B1_{ref}$ as checked at the step 204, the second variation rate $A_2$ is then compared with a second threshold value $B2_{ref}$ at a step 205. The second threshold value $B2_{ref}$ is set at a value representative of a minimum possible variation of lateral acceleration during vehicular rolling. In the shown embodiment, the second threshold value $B2_{ref}$ is set at a value corresponding to 0.15 G. If the second variation rate $A_2$ is greater than or equal to the first threshold value $B2_{ref}$, the suspension control signal ordering harder suspension is output at a step 207. On the other hand, when the second variation rate $A_2$ is smaller than the second threshold value $B2_{ref}$ as checked at the step 205, the suspension control signal ordering softer suspension is output at a step 206.

Figure 2:
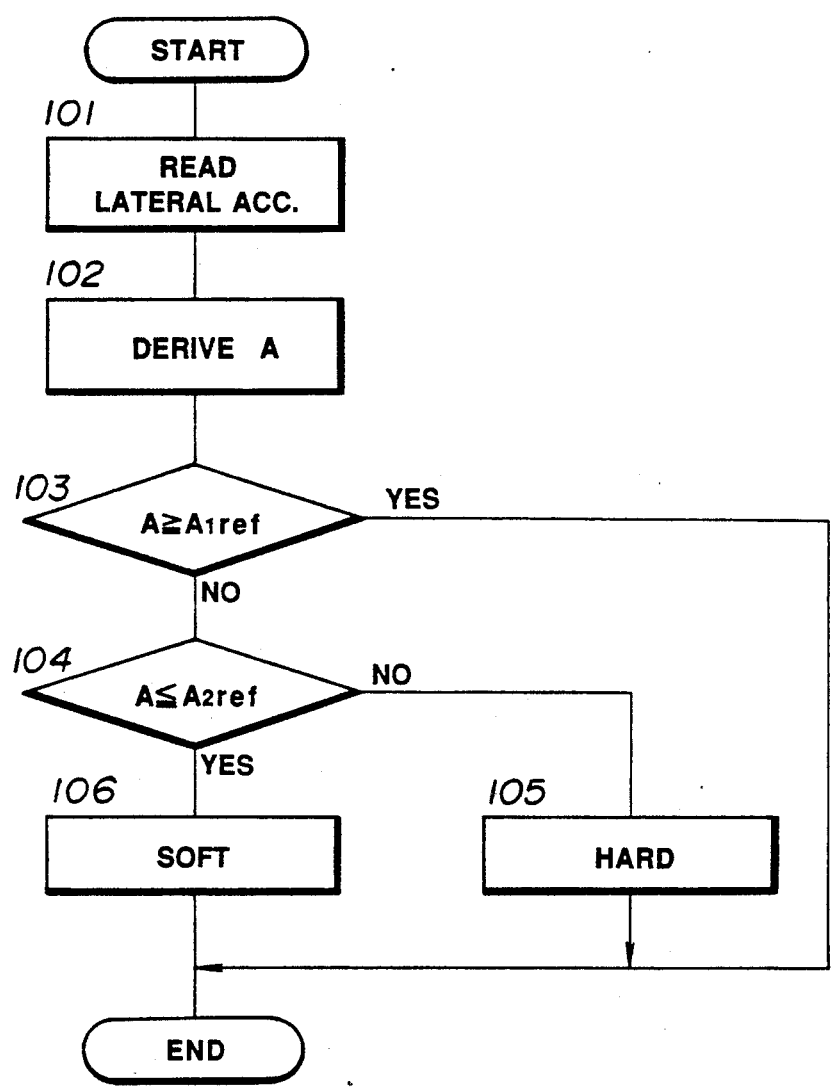
FIG. 2 is a flowchart of a routine for determining suspension characteristics.
Figure 8:
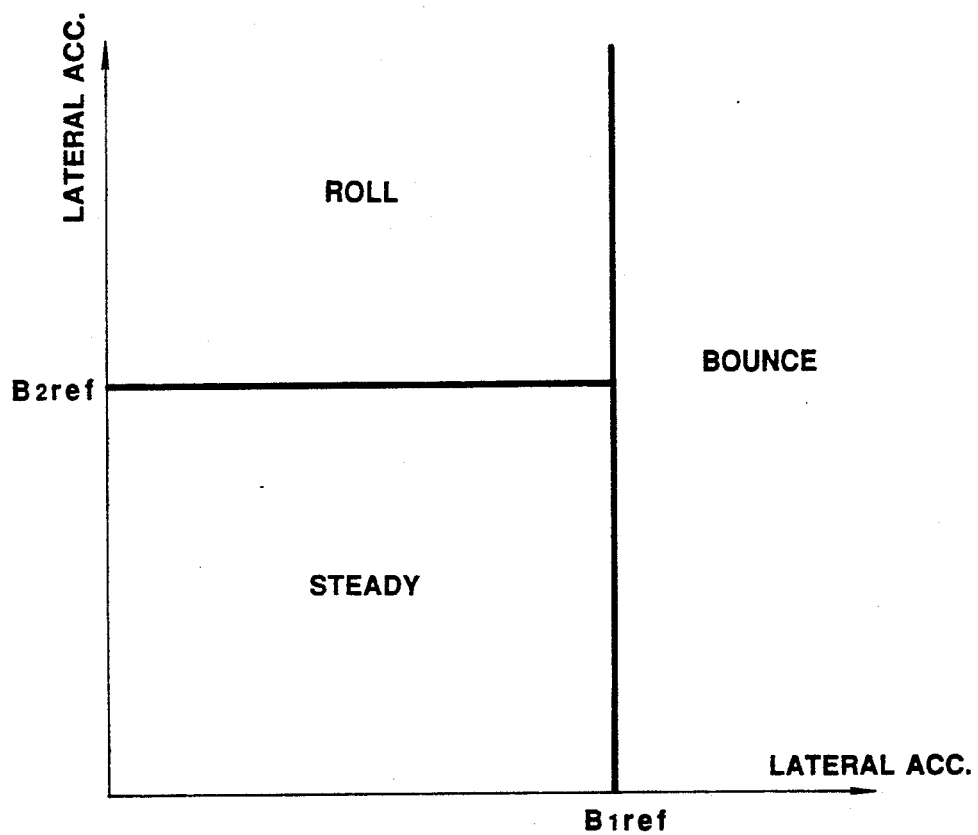
FIG. 8 is a chart showing a variation rate of lateral acceleration relative to the modes of vibration of road shock, vehicular rolling and vehicular bouncing.

By introducing the secondary variation rate of the lateral acceleration over a shorter interval than that of the first variation rate, the characteristics as illustrated in FIG. 8 can be established. The characteristics obtained in the process of FIG. 7 thus achieve an effect equivalent to that achieved by the process of FIG. 2.

As will be appreciated herefrom, since the present invention avoids the occurrence of hardening of the suspension characteristics during vehicular bouncing, the frequency of switching of the suspension mode can be reduced for expansion of lift of the actuator or other movable component active for varying the suspension characteristics. Furthermore, since the present invention maintains suspension characteristics in a soft mode even when a substantial magnitude of lateral acceleration is detected due to vehicular bouncing, vehicular riding comfort at relatively low vehicle speed can be assured.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. A suspension control system for an automotive vehicle comprising:
   means for adjusting suspension characteristics of a suspension system disposed between a vehicle body and a suspension member on which a vehicular wheel is supported;
   means for monitoring lateral acceleration exerted on the vehicular body and for producing a lateral acceleration indicative signal;
   means for deriving a variation rate of lateral acceleration on the basis of said lateral acceleration indicative signal;
   means for detecting a vibration mode of the vehicular body on the basis of the variation rate of lateral acceleration, for producing a suspension control signal representative of one of a plurality of suspension characteristics on the basis of the detected vibration mode of the vehicular body, for controlling said suspension characteristics adjusting means.

2. A suspension control system as set forth in claim 1, wherein said detecting means compares said variation rate of the lateral acceleration with a predetermined first threshold value representative of a criterion between vehicular bouncing and vehicular rolling for deriving suspension characteristics on the basis of the result of comparison.

3. A suspension control system as set forth in claim 2, wherein said detecting means further compares said variation rate of the lateral acceleration with a second threshold value representative of a criterion between vehicular rolling and steady traveling state so as to derive suspension characteristics on the basis of the result of comparison.

4. A suspension control system as set forth in claim 2, wherein said detecting means determines said control signal ordering a harder suspension characteristics when the vehicular vibration mode in rolling is detected.

5. A suspension control system as set forth in claim 2, wherein said variation rate deriving means derives a first variation rate over a first longer time interval and a second variation rate over a second shorter time interval, and said detecting means compares said first variation rate with said first threshold for discriminating vehicular vibration mode between bouncing mode and rolling mode.

6. A suspension control system as set forth in claim 5, wherein said detecting means compares said second variation rate with a second threshold defining a criterion between vehicular rolling mode and steady traveling state for discriminating rolling state and steady state.

* * * * *